United States Patent [19]

Thadani et al.

[11] Patent Number: 4,604,581

[45] Date of Patent: Aug. 5, 1986

[54] METHOD AND APPARATUS FOR DECONVOLVING APPARENT CONDUCTIVITY MEASUREMENTS IN INDUCTION WELL LOGGING

[75] Inventors: Suresh G. Thadani; Gulamabbas A. Merchant, both of Houston, Tex.

[73] Assignee: Halliburton Company, Duncan, Okla.

[21] Appl. No.: 457,150

[22] Filed: Jan. 11, 1983

[51] Int. Cl.$^4$ ............... G01V 3/28; G01V 3/18
[52] U.S. Cl. ................. 324/339; 364/422; 364/581
[58] Field of Search ............... 324/338–346, 324/332–337; 364/422, 581

[56] References Cited

U.S. PATENT DOCUMENTS

| | | | |
|---|---|---|---|
| 2,582,314 | 1/1952 | Doll | 324/339 |
| 3,119,061 | 1/1964 | Tanguy | 324/339 |
| 3,147,429 | 9/1964 | Moran | 324/339 |
| 3,166,709 | 1/1965 | Doll | 324/339 |
| 3,340,464 | 9/1967 | Gouilloud | 324/339 |
| 3,403,327 | 9/1968 | Welz | 324/339 |
| 3,706,025 | 12/1972 | Regat | 324/339 |
| 4,276,599 | 6/1981 | Timmons et al. | 324/339 X |
| 4,302,722 | 11/1981 | Gianzero | 324/339 |
| 4,334,271 | 6/1982 | Clavier | 364/422 |
| 4,357,660 | 11/1982 | Hepp | 364/422 |
| 4,414,656 | 11/1983 | Hepp | 364/422 X |
| 4,467,425 | 8/1984 | Schaefer et al. | 324/339 X |
| 4,471,436 | 9/1984 | Schaefer et al. | 324/339 X |

OTHER PUBLICATIONS

Moran et al., "Basic Theory of Induction Logging and Application to Study of Two-Coil Sondes", Geophysics, vol. 27, No. 6, 12/1962, pp. 829–858.

Thadani and Hall, Jr., "Propagated Geometric Factors in Induction Logging", presented at 22nd Annual SPWLA Symposium, Jun. 1981.

Doll, H. G., "Introduction to Induction Logging and Application to Logging of Wells Drilled with Oil Base Mud", Petroleum Transaction, AIME, T.P. 2641 (Jun. 1949).

Rice, R. B., "Inverse Convolution Filters", Geophysics, vol. 27, #1 (1962).

Ford, W. T. et al, "Least Squares Inverse Filtering", Geophysics, vol. 31, #5 (1964).

Cheney, E. W., Introduction to Approximation Theory, pp. 28–51 (McGraw-Hill) (1966).

Merchant, G. A. et al, "Inverse Filtering for Systems with Unit Circle Zeros" (paper presented at 1981 IEEE Symposium).

Primary Examiner—Gerard R. Strecker
Assistant Examiner—Warren S. Edmonds
Attorney, Agent, or Firm—William J. Beard

[57] ABSTRACT

Induction well logging methods and apparatus are disclosed for deconvolving apparent conductivity measurements obtained for a induction logging coil system. The well logging system is operated so that it has a substantially fixed vertical response. The fixed vertical response function is used to design an inverse (deconvolution) filter by using a minimum Tchebycheff norms technique. The inverse filter function is stored and employed to convert (deconvolve) signals obtained from the induction coil system to signals functionally related to the actual conductivity of an incremental layer of a formation being logged.

11 Claims, 6 Drawing Figures

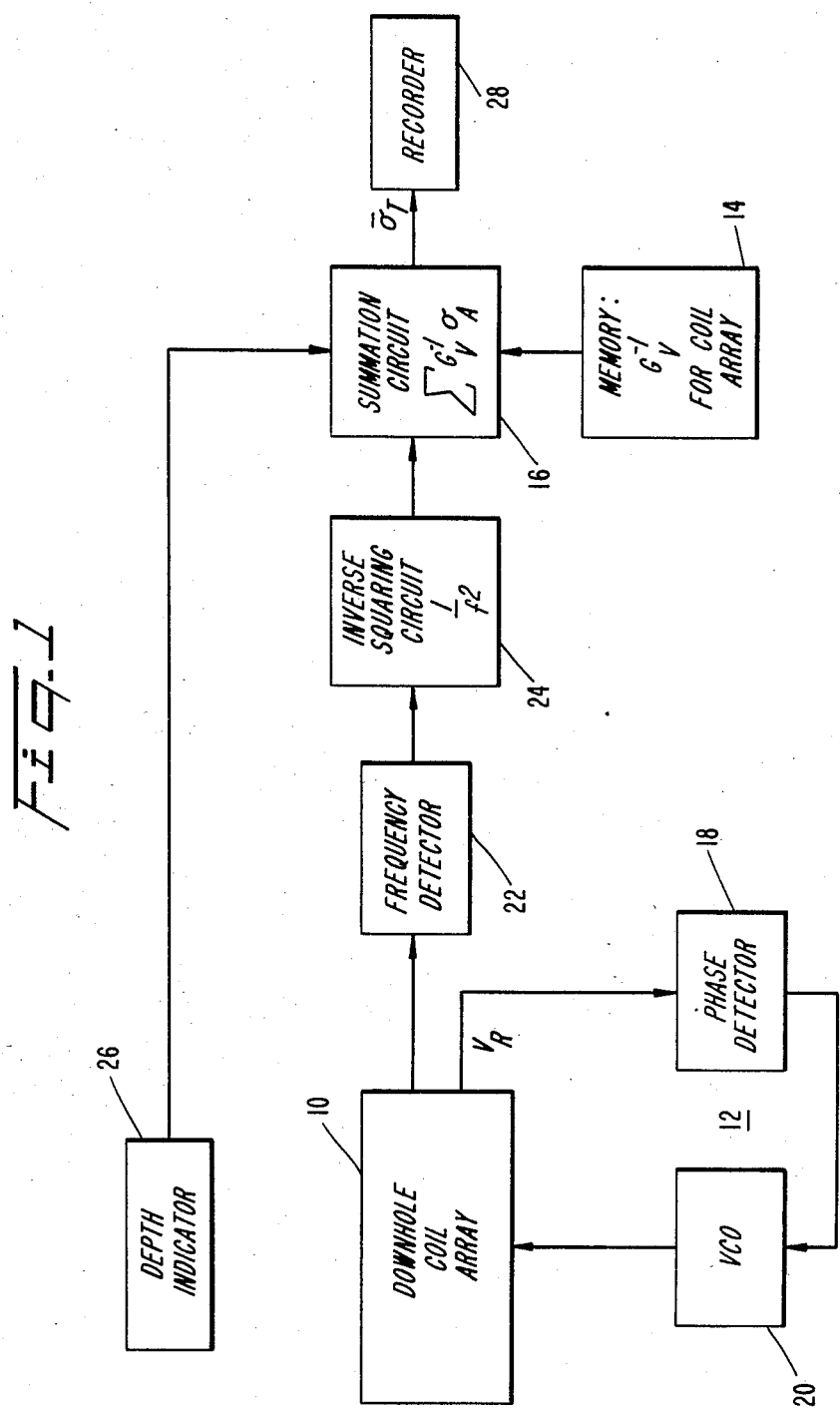

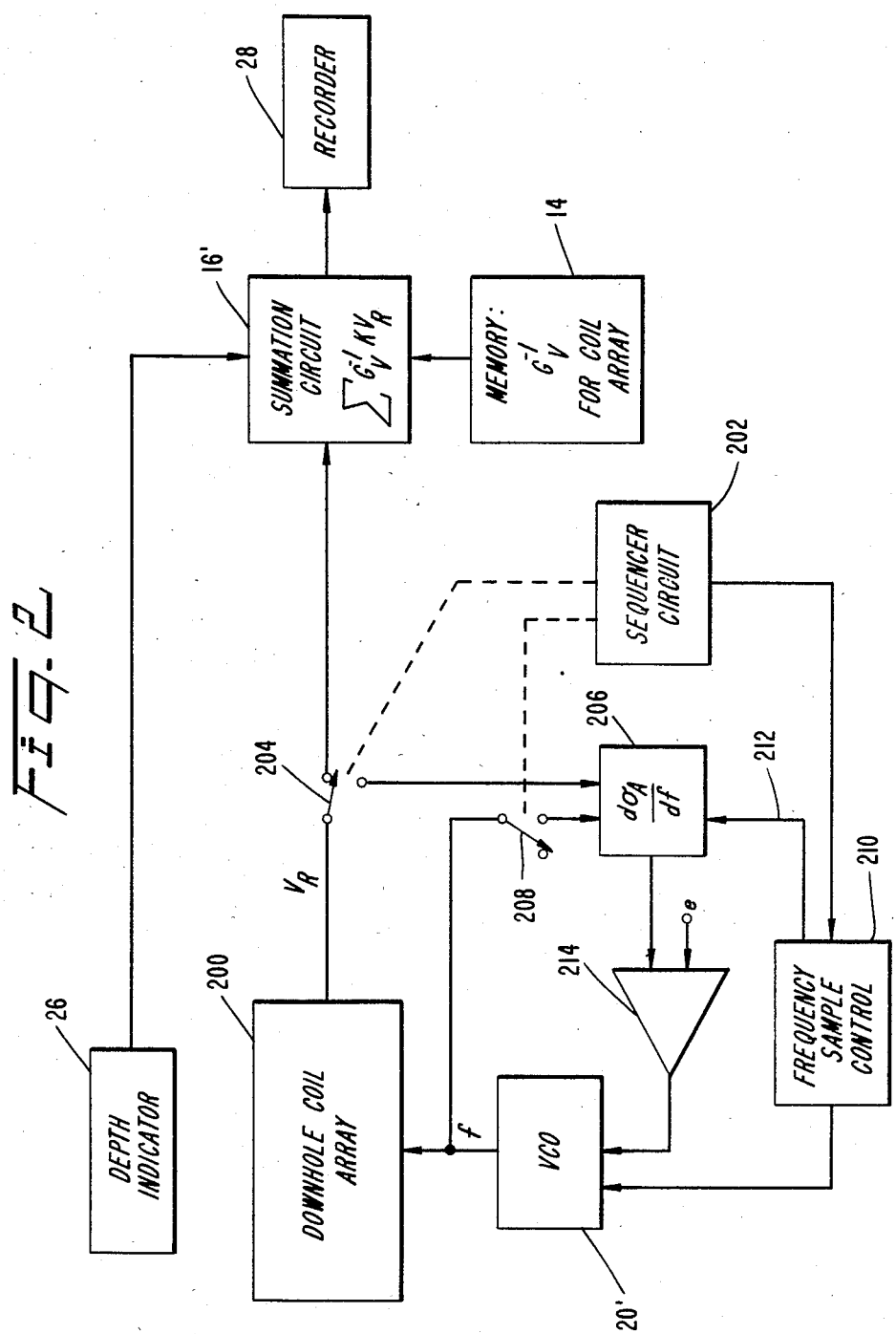

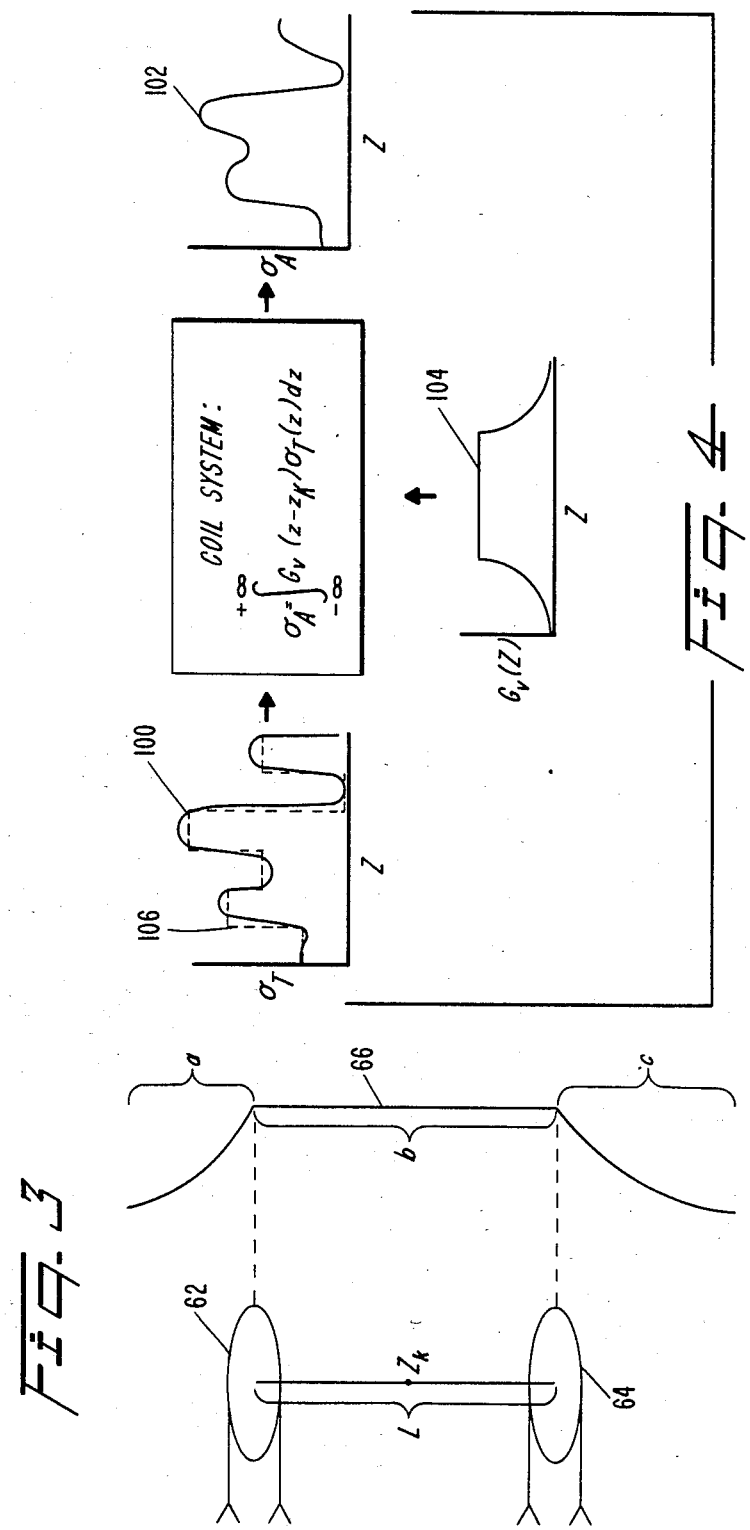

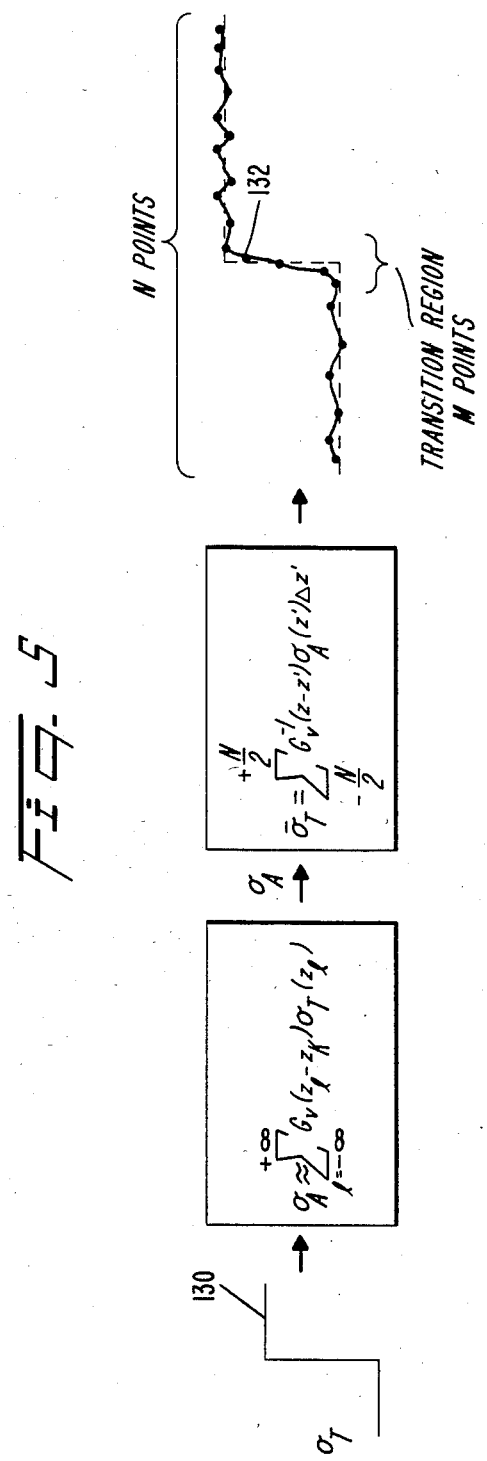

4,604,581

METHOD AND APPARATUS FOR DECONVOLVING APPARENT CONDUCTIVITY MEASUREMENTS IN INDUCTION WELL LOGGING

BACKGROUND OF THE INVENTION

The present invention relates to methods and apparatus for electromagnetic well logging, and more particularly to well logging employing a novel, deconvolution technique, adaptable to accurate measurement of formation conductivites in a wide variety of formation environments.

In induction well logging, a coil system is lowered into a well bore for the purpose of investigating the electrical properties of earth formations adjacent the well bore. An electrical property of interest in such investigation is the electrical conductivity of particular portions of the formation.

Typically, induction logging coil systems include at least one transmitter coil and one receiver coil, though plural coils or coil arrays are often employed in place of a single transmitter coil or single receiver coil. A time varying signal is impressed on the transmitter coil or coil array and a signal is received by the receiver coil or coil array. The received signals are a function of the coil system structure and the coil system environment, which, of course, includes formation portions of interest.

It is an object of the present invention to approximately determine the true conductivity of incremental horizontal layers of the formation immediately adjacent to the induction tool coil system and compensate for undesired effects on the measured signal due to the presence of nearby layers or strata of arbitrary thicknesses and conductivities.

It is known in the prior art to measure and record data obtained by an induction coil system at a plurality of depths and combine predetermined fractions of the signals to produce an adjusted value for the conductivity of the formation. Such a technique is taught in U.S. Pat. No. 3,166,709 to Doll. To do this Doll defines so-called "geometric factors" which are said to depend exclusively on the dimension and position of the coils with respect to the formation. However, the apparent conductivities measured by the induction coil array differ significantly from those estimated by using the Doll geometric factors particularly in high conductivity formations (i.e., greater than 1 mho per meter) as indicated in Thadani and Hall, Jr., "Propagated Geometric Factors In Induction Logging," presented at the 22nd Annual SPWLA Symposium, June 1981.

A variable frequency well logging system (FIGS. 1 and 1a) which obtains accurate conductivity measurements through wide variations in formation conductivity, without requiring instrumentation with wide dynamic range, is the subject of the patent application of Bravenec, Hall, Merchant and Thadani filed on an even day herewith and assigned Ser. No. 457,149. A second variable frequency well logging system (FIG. 2), designed to minimize propagation effects, is part of the subject matter of this patent application.

The aforementioned Doll technique does not provide a rigorous means for determining true conductivity and delineating accurately layers of selected thickness for the useful, general case of a cylindrically symmetric formation having an arbitrary arrangement of layers or strata of different, arbitrary thicknesses and conductivities because propagation effects are ignored.

It is an object of the present invention to provide such a technique.

These and other objects and features of the present invention will become apparent from the claims and from the following description when read in conjunction with the accompanying drawings.

SUMMARY

The present invention relates to a method and apparatus for measuring the conductivity of a general cylindrically symmetric layered earth formation with no invasion, the true conductivity being determined for incremental layers of the earth formation at various depths of interest.

A method according to the present invention involves running a coil system of essentially arbitrary geometric configuration centered in a well bore, the coil system including at least one receiver coil and at least one transmitter coil; impressing a signal on the transmitter coil; measuring an electrical parameter of the coil system (such as receiver voltage or transmitter frequency) at different depths in the well bore to provide a signal related in value to the apparent conductivity of the formation; operating on a selected plurality of the measured electrical parameters with the inverse vertical response function peculiar to the coil system; and summing the products of the foregoing step over a selected range of depths to produce a signal related in value to the conductivity of the earth formation adjacent the well bore at the depth of interest.

In the practice of this method N measurements of apparent conductivity, $\sigma_A$, may be derived from the in phase response of the coil system at N different depths. Advantageously, these N measurements may be made through a range of depths approximately centered at a depth of interest $z_k$ corresponding to the position of the electric center of the coil system. Each of the N apparent conductivity measurements may be operated on by a corresponding one of the N stored values of the inverse vertical response function for the coil system. The products of this operation may be summed to obtain an approximation of the conductivity of an incremental portion of the formation at the depth of interest.

Apparent conductivity measurements obtained from an induction logging coil system are deconvolved by the methods and apparatus of the present invention. A vertical response function $G_v$, for the particular coil system is derived assuming negligible propagation effects, the vertical response function being dictated by the structure of the coil system. Values for an inverse vertical response function or deconvolution filter, $G_v^{-1}$, are then obtained by means of the ascent algorithm for the case of a single (conductivity) step function. The maximum error in the replication of the single step function is minimized for N selected depths.

The values of the inverse vertical response function so obtained may be applied to the convolved step function to approximate the original step function. Signals obtained from the induction logging coil system, functionally related to the apparent conductivity of the formation, may then be converted to a signal functionally related to the actual conductivity of an incremental layer of the formation by employing the inverse vertical response function to deconvolve the coil system signals.

An apparatus for measuring the conductivity of earth formations, provided in accordance with the teachings of the present invention, may include a coil system having at least one transmitting coil and one receiving coil. An oscillator and amplifier may be provided for applying a time varying signal to the transmitting portion of the coil system. An electrical characteristic of the coil system, such as the receiver voltage, may be detected at a plurality of depths in the well bore to produce an electrical signal related in value to the apparent conductivity at each of the plurality of depths. The transmitted signal may be tuned in response to the rate of change of apparent conductivity with an induced variation in frequency of the signal. A memory may be provided for storing the values of an inverse vertical response function $G_v^{-1}$ for N locations in a range approximately centered at a reference location $z_k$ of the coil system, N being selected according to the degree of depth resolution to be achieved. The values for the function $G_v^{-1}$ may be read from storage and combined with values of the electrical signal to produce an approximation of the true conductivity of an incremental layer of the formation. This process is performed by summing the product of the inverse vertical response function and the electrical signal related in value to the apparent conductivity for each of the N locations.

BRIEF DESCRIPTION OF THE DRAWINGS

FIG. 1 is a schematic block diagram of an induction well logging system employing a frequency variation technique.

FIG. 2 is a schematic block diagram of an induction well logging system employing an alternative frequency variation technique.

FIG. 3 is a schematic diagram of a two coil induction well logging system and its electrical response curve in an environment where propagation effects are negligible.

FIG. 4 is a schematic representation of the convolution of true formation conductivity $\sigma_T$ in a two coil induction logging system.

FIG. 5 is a schematic representation of a process of the present invention leading to an approximation of the inverse vertical response function $G_v^{-1}$ for an induction logging system.

DETAILED DESCRIPTION

Figure 1A:
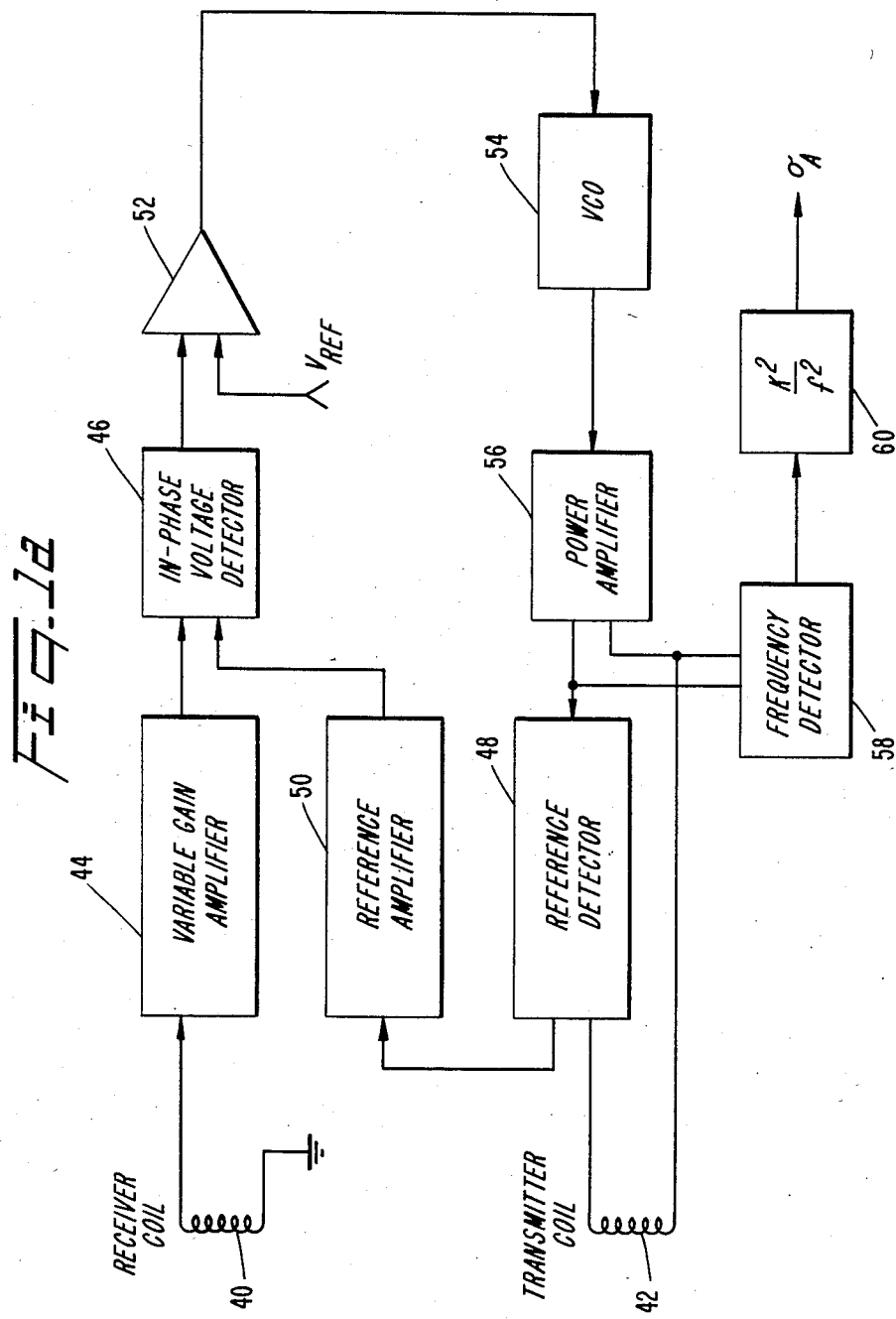
FIG. 1a is a schematic block diagram of downhole components of the induction well logging system shown more generally in FIG. 1.

The present invention provides methods and devices for determining the conductivity of an incremental layer of a formation in a well bore, for a generalized formation having strata of arbitrary thicknesses and conductivities.

As discussed above it is difficult to obtain such data from measurements obtained from a fixed frequency induction system because the vertical response (functions) of the fixed frequency system is highly conductivity dependent. In the present invention, the vertical response of the coil system is maintained essentially constant for all conductivities to facilitate the obtaining of accurate measurements of true conductivity.

The electromagnetic fields produced by the transmitter coils of the induction logging system experience both attenuation and phase shift (time delay) as they propagate through the formation. These "propagation effects" intensify with increasing operating frequencies of the coil system and with increasing formation conductivities. Recently, it has been shown (Thadani and Hall, supra.) that by solving the underlying Maxwell's equations, the voltage induced in the receiver coils may be exactly expressed by the equation $$V_R = K \int_{-\infty}^{+\infty} \int_0^{+\infty} \sigma(\rho,z) g_P(\rho,z) d\rho dz$$

in equation (1) K is a constant that depends on the coil system dimensions and on the square of the operating frequency i.e.

$$K = K_1 f^2 \qquad (2)$$

Also, $\sigma(\rho, z)$ represents the conductivity of a formation point located at a point with cylindrical coordinates $(\rho, z)$. The weighting factor $g_P(\rho, z)$ determines the relative contribution of the formation element at $(\rho, z)$ to the receiver voltage $V_R$ and is termed the propagated geometric factor ("pgf"). While not explicitly indicated, the pgf $g_P(\rho, z)$ depends on the entire formation conductivity distribution, the relative position of the coil system with respect to the point $(\rho, z)$ and on the frequency of operation f. If propagation effects are negligible, then the receiver voltage $V_R$ may be expressed by the approximation:

$$V_R \cong K \int_{-\infty}^{+\infty} \int_0^{\infty} \sigma(\rho,z) g_D(\rho,z) d\rho dz \qquad (3)$$

See Doll, H. G.: "Introduction to Induction Logging and Application to Logging of Wells Drilled with Oil Base Mud," Petroleum Transaction, AIME, T.P. 2641, (June 1949). In the above equation the weighting factor $g_D(\rho, z)$ is known as the Doll geometric factor (gf). In particular, $g_D(\rho, z)$ depends only on the relative position of the coil system with respect to the formation point $(\rho, z)$, and is independent of the formation conductivity distribution and of the operating frequency f. The crucial difference between equations (1) and (3) is that equation (3) represents a linear depth invariant system, while equation (1) represents a nonlinear depth varying system. As a result the deconvolution extraction of the formation conductivity $\sigma(\rho, z)$) of equation (3) can be accomplished with linear system techniques discussed below, while the deconvolution of equation (1) poses a formidable adaptive inverse filtering problem.

A solution to the problem may be approached by performing the well logging so that the approximation of equation (3) is satisfied in the formation strata encountered. This may be done by varying the operating frequency of the induction coil system in such a manner that the propagated geometric factors, $g_P(\rho, z)$, are essentially identical to the Doll geometric factors, $g_D(\rho, z)$. As a result the induction coil system is consistently operated so that equation (3) holds with negligible error, and propagation effects are negligible. Two techniques for accomplishing this frequency variation will now be discussed. These techniques facilitate the use of the linear deconvolution methods, described below, to obtain more accurate values of the true conductivity then can be determined presently using fixed frequency induction logging systems and a multiple point filter such as proposed by Doll.

The first technique makes use of equation (3) in a homogeneous medium. In such a medium it is well known that $$V_R = K\sigma_H = K_1 f^2 \sigma_H \quad (4)$$

where $\sigma_H$ is the conductivity of the homogeneous medium. In inhomogeneous formations $\sigma_H$ may be replaced by the value for apparent conductivity, $\sigma_A$.

The frequency of operation f of the system may be varied in a manner so that the product $$f^2 \sigma_H = (V_R/K_1) = K_2 \quad (5)$$

is constant. In other words the receiver voltage $V_R$ is held constant at some predetermined value. The specific value for $V_R$ is chosen by selecting a frequency $f_o$ and homogeneous formation conductivity $\sigma_o$ for which propagation effects are negligible. In order for propagation effects to be negligible, the inequality $$L/S \ll 1 \quad (6)$$

must be satisfied, where L is the effective length of the induction coil system (typically about 40") and S is skin depth $$S = \sqrt{\frac{1}{\pi\mu\sigma_H f}} \quad (7)$$

As an example the skin depth S for $\sigma_o = 1$ mmho/meter and $f_o = 100$ KHz is approximately 165 meters and the inequality (6) is satisfied. Using these values in equation (5) gives a value for $K_2 = f^2 \sigma_o = 1 \times 10^{10} \times 10^{-3} = 1 \times 10^7$. If the frequency is now varied, according to equation (5) (assuming a homogeneous medium) the skin depth $S_V$ would vary with formation conductivity according to the equation $$S_v = \sqrt{\frac{1}{\pi\mu\sigma_H f}} = \sqrt{\frac{1}{\pi\mu\sigma_H}} \sqrt{\frac{K_2}{\sigma_H}} \quad (8)$$

$$= K_4 \sqrt{\frac{1}{\pi\mu\sqrt{\sigma_H}}}$$

where $$K_4 = \frac{1}{\sqrt[4]{K_2}} = \frac{1}{\sqrt[4]{f_o^2 \sigma_o}}$$

The ratio of the skin depth $S_V$ to the skin depth $S_F$ for a fixed frequency (F) logging system is given by $$R = \frac{S_v}{S_f} = K_4 \sqrt{F} \cdot \sqrt[4]{\sigma_H} \quad (9)$$

Table I enumerates R, $S_F$, and $S_V$, $L/S_F$ and $L/S_V$ versus conductivity for the example referred to earlier (L=40"). As is clear from the table, the $L/S_V$ ratios improve upon the $L/S_F$ ratios at conductivities greater than 10 mmho/M. For conductivities less than 10 mmho/M, the $L/S_V$ ratios are larger than the $L/S_F$ ratios; however the absolute magnitudes of the $L/S_V$ ratios are still small enough so that propagation effects are negligible. It should be noted that by properly choosing the constant $K_2$ still lower ratios could be achieved. However this would entail operation at lower frequencies and lower constant $V_R$ levels.

TABLE I

| (mmho) | R | $S_F$ (feet) | $S_V$ (feet) | f (KHz) | $L/S_F$ | $L/S_V$ |
|---|---|---|---|---|---|---|
| 1 | 0.4482 | 369.2117 | 165.4675 | 100 | 0.0090 | 0.0201 |
| 10 | 0.7969 | 116.755 | 93.04 | 31.62 | .0285 | 0.0358 |
| 100 | 1.4170 | 36.9212 | 52.31 | 10 | 0.0902 | 0.0637 |
| 1000 | 2.5200 | 11.6755 | 29.42 | 3.162 | 0.2855 | 0.1133 |
| 5000 | 3.5566 | 5.2175 | 18.5565 | 1.414 | 0.6389 | 0.1796 |
| 10000 | 4.4812 | 3.6921 | 16.5451 | 1 KHz | 0.9028 | 0.20 |

One further important point should be made. Since the voltage $V_R$ is held constant in the above described technique, the measured quantity would be the frequency of operation f. Rearranging equation (5) one obtains the equation $$f = \sqrt{\frac{K_2}{\sigma_H}} \quad (10)$$

Equation (10) indicates that the dynamic range of the frequency measurement would be 40 db as compared to a dynamic range of 80 db for direct measurement of $V_R$ as an indication of conductivity. Referring to Table I this is confirmed by the range of variation for f which is 1 KHz–100 KHz or 40 db. This reduction in dynamic range is a distinct advantage of variable frequency operation.

A second frequency variation technique proceeds directly with equation (1) viz:

$$V_R = K \int_{-\infty}^{+\infty} \int_0^{+\infty} \sigma(\rho,z) g_P(\rho,z) d\rho dz \quad (1)$$

The apparent conductivity $\sigma_A$ is given by $$\sigma_A = \frac{V_R}{K} = \int_{-\infty}^{+\infty} \int_0^{+\infty} \sigma(\rho,z) g_P(\rho,z) d\rho dz \quad (11)$$

As noted earlier the pgf $g_P(\rho, z)$ will approach the Doll gf $g_D(\rho, z)$ as propagation effects decrease. Once again the frequency of operation f is decreased so as to reduce propagation effects. However in this technique, the rate of change of the apparent conductivity $\sigma_A$ with respect to frequency is monitored. If this slope is close to zero then $g_P(\rho, z)$ is approximately equal to $g_D(\rho, z)$ and propagation effects are negligible. In practice, the slope is compared with a preset threshold e and the frequency reduction from some initial frequency $f_o$ (for example, 100 khz) is stopped whenever the slope becomes smaller than this threshold. The advantage of this technique is that propagation effects are minimized to a degree determined by the selection of the threshold e, for any arbitrary inhomogeneous formation. However the dynamic range of the apparent conductivity is not reduced by using this technique.

In both techniques (1) and (2), the actual frequency variation can be accomplished either in analog (feedback) or digital mode. A digital ("table look up") mode may be preferable in certan applications, because the apparatus need only be capable of producing a preselected finite number of frequencies.

For example, the operating frequency of the system can be changed in a step-wise fashion in response to changes in the apparent conductivity of the formation using a set of preselected cut-off parameters for determining the operating frequency of the system in a particular environment. For example, the following operating frequencies could be used with the corresponding conductivity ranges:

TABLE II

| $\sigma_A$ (mmhos) | f |
|---|---|
| 5000 to 1000 | 2 kHz |
| 1000 to 100 | 4 kHz |
| 100 to 10 | 12.5 kHz |
| 10 to 1 | 40 kHz |

This example is offered by way of illustration, it being readily understood that other ranges including overlapping ranges could be selected for operation of the system.

Use of the frequency variation techniques described above allows the operation of the coil system in an environment in which propagation effects are minimized. In this environment equation (3) holds with negligible error.

$$V_R \cong K \int_{-\infty}^{+\infty} \int_0^{\infty} \sigma(\rho,z) g_D(\rho,z) d\rho dz \quad (3)$$

If borehole and invaded zone effects are negligible then equation (3) collapses to the one dimensional convolution integral $$\sigma_A(z') = \int_{-\infty}^{+\infty} \sigma(z) G_D(z,z') dz \quad (12)$$

$$\stackrel{\Delta}{=} \sigma(z) * G_D(z,z')$$

In equation (12), $\sigma(z)$ represents the true formation conductivity profile with respect to depth. Also $G_D(z, z')$ is the vertical investigation characteristic or response function. As noted earlier equation (12) represents a linear depth invariant system sensing the formation parameter $\sigma(z)$ and producing an output signal related in value to the apparent conductivity $\sigma_A(z')$. This system is readily amenable to linear deconvolution techniques.

There are several basic ideas implicit in the novel deconvolution technique disclosed herein. First, the actual formation conductivity may be modeled as a staircase conductivity profile. This "staircase" conductivity profile $\sigma(z)$ may in turn, be expressed as a weighted linear combination of unit step functions. The deconvolution of the weighted linear unit step combination $\sigma(z)$ may be constructed by using a weighted linear combination of unit step function deconvolutions. The convolution of a single unit step function $u(z)$ may be accomplished by using minimum Tchebycheff norm filter design techniques.

To illustrate the deconvolution of a single unit step function, suppose that the response to a single unit step $u(z)$ is given by $\sigma(z')$ viz $$\sigma_{A1}(z') = u(z) * G_D(z,z') \quad (13)$$

suppose $G_D^{-1}(z, z')$ is the desired deconvolution filter for the unit step $u(z)$. Then the signal $\widetilde{u(z)}$ should closely approximate $u(z)$.

$$\widetilde{u}(z) = \sigma_{A1}(z') * G_D^{-1}(z,z') \quad (14)$$

$$= u(z) * G_D(z,z') * G_D^{-1}(z,z')$$

The coefficients of the desired filter $G_D^{-1}(z, z')$ may be determined by minimizing the error between $u(z)$ and its estimate $\widetilde{u}(z)$. In particular the error criterion E (Tchebycheff norm) is chosen to be $$E = \max_z | u(z) - \widetilde{u}(z) | \quad (15)$$

$$= \max_z | u(z) - \widetilde{u}(z) * G_D(z,z') * G_D^{-1}(z,z') |$$

The coefficients of the deconvolution filter are determined by minimizing E with respect to these coefficients. An efficient algorithm to carry out the above minimization currently exists in the literature. This algorithm is known as the Ascent algorithm. It should be noted that the deconvolved unit step function $\widetilde{u}(z)$ will always have a finite transistion region where its value changes from 0 to 1. Also the portions of $\widetilde{u}(z)$ away from the transition region will not be exactly flat but will exhibit some ripple. A useful aspect of this solution technique is that it allows the specification of the length of the transition region. In particular the shorter the transition region, the larger the ripple in the portions of $\widetilde{u}(z)$ outside the transition region. This trade off between transition region length and ripple provides for a large degree of flexibility in the design of the deconvolution filter. In general the above scheme will provide a deconvolution filter with much sharper transition regions than the least squares deconvolution filters. See, R. B. Rice, "Inverse Convolution Filters," *Geophysics*, Vol. 27, #1 (1962); W. T. Ford et al, "Least Squares Inverse Filtering," *Geophysics*, Vol. 31, #5 (1964).

It is an aspect of this invention to provide a method and apparatus by which accurate, deconvolved conductivity data can be obtained. More specifically, the apparent conductivity data produced by a system in which variations in the vertical response of the tool due to propagation effects are minimized, can be deconvolved to an essentially arbitrary degree of accuracy dependent on the number of data points selected for each deconvolution computation and upon the computational capacity of the system itself. Well logging devices employing the first frequency variation technique and the deconvolution techniques, discussed above, are shown schematically in FIGS. 1 and 1a.

In FIG. 1, a generalized downhole coil array is indcated by the numeral 10. The coil array 10 may include an arbitrary number of receiver coils and an arbitrary number of transmitter coils. U.S. Pat. No. 2,582,314 to Doll presents numerous different induction logging coil arrays and their approximate vertical and lateral response functions obtained by ignoring propagation effects.

A feedback system 12 is provided to stabilize the vertical response of the coil array so that the response is approximately conductivity independent. Calculated values for the inverse vertical response function for the coil array 10 in an environment in which propagation effects are negligible, are stored in memory 14. This data is employed by the summation circuit 16 to deconvolve the response of the coil array to provide approximations of the true conductivity of incremental layers of the formation at depths of interest.

The vertical response of the coil array is maintained approximately constant by the feedback loop 12. That feedback loop detects a voltage across at least one of the receiver coils $V_R$. A component of the receiver voltage in-phase with the time varying transmitter voltage is detected by phase detector 18. The in-phase component of the receiver voltage is then applied to a voltage control oscillator 20, which in turn is used to drive the transmitter coil array. Thus variations in the detected in-phase component of the receiver coil voltage are used to control the operating frequency of the coil array itself.

A signal proportional to the apparent conductivity of the formation encountered is obtained by first detecting the operating frequency of the coil array with the frequency detector 22. The inverse square of the detected frequency is then calculated by the circuit 24. An output signal of the inverse squaring circuit is proportional to the apparent conductivity at various tool depths, the depths being indicated by the depth indicator 26. Data concerning the depths, the apparent conductivity, and the inverse vertical response function of the particular tool structure are applied to summation circuit 16 which deconvolves the response of the coil array 10 to produce approximations of the true conductivity at various depths of interest. This data may be recorded as a function of depths by the recorder 28.

Referring now to FIG. 1a, a schematic block diagram is shown for a variable frequency induction logging system employing a coil system having a single receiver coil 40 and a single transmitter coil 42, it being understood that the teachings illustrated in the Figure can be applied to multiple coil systems such as conventional focused systems using 3, 6 or 7 coils. The signal received from the receiver coil is applied to a variable gain amplifier 44. An output signal of the variable gain amplifier 44 is then applied to an in-phase voltage detector 46. The output signal of the in-phase voltage detector 46 is approximately proportional to the portion of the received signal in-phase with the transmitter current. This relationship is insured by detecting the transmitter current by means of the reference detector 48 and reference amplifier 50 which provide a second signal to the voltage detector 46 as a reference so that the in-phase component of the receiver voltage can be selected.

An output signal of the in-phase voltage detector may be applied to one input terminal of a comparator 52 where the in-phase signal is compared to a reference voltage, $V_{REF}$. The difference signal output of the comparator 52 is applied as a control signal to a voltage control oscillator 54, the voltage control oscillator providing the time varying signal which drives the transmitter coil 42. An output signal of the voltage control oscillator 54 is amplified by power amplifier 56 and applied to the transmitter coil 42 thereby completing the feedback loop.

The operating frequency of the coil system is detected by frequency detector 58 and an output signal therefrom is applied to an inverse squaring circuit 60 which produces a signal related in value to the apparent conductivity of the formation surrounding the receiver and transmitter coils.

A well logging system employing the second frequency variation technique and the deconvolution technique discussed above is shown schematically in FIG. 2.

In FIG. 2, a generalized downhole coil array is indicated by the numeral 200. Conductivity data may be obtained from a receiver voltage signal $V_R$, produced by the coil array, which is operated on by deconvolution circuitry similar to that discussed in connection with FIG. 1 to obtain a value for the approximate true conductivity of the formation at depths of interest.

A control system is provided to insure that the system is operated at a frequency at which propagation effects are below the preset threshold e. In other words, propagation effects are minimized to a degree determined by the selection of the threshold value e.

The downhole coil array may be driven by voltage controlled oscillator 20'. The mechanism for determining the frequency of operation of the VCO and coil array will now be discussed.

The VCO produces a driving signal at frequency f. This signal is applied to the downhole coil array and produces the voltage $V_R$ at a receiver coil as an indication of actual formation conductivity. A sequencer circuit 202 initiates a tuning sequence during which the VCO is tuned to a frequency which minimizes propagation effects below the predetermined threshold e. At the beginning of the tuning sequence, a switch 204 may be actuated by the sequencer circuit to apply the receiver voltage signal to differentiator circuit 206. At about the same time, a switch 208 may be closed by the sequencer circuit to apply the driving signal from the VCO to the differentiator circuit 206.

The sequencer circuit enables a frequency sample control 210 which varies the frequency of the output signal of the VCO in a predetermined pattern. For example, the frequency may be stepped up or down or swept with a triangular wave dithering signal. The timing of the frequency variation is communicated to the differentiator circuit 206 as indicated by connection 212.

The differentiator circuit determines the rate of change of actual formation conductivity (which is approximately proportional to receiver voltage) with frequency. A signal related in value to this rate of change may be applied to a first input terminal of a differential amplifier 214 which compares the rate of change to a reference signal related in value to the predetermined threshold e. An output difference signal from the differential amplifier 214 may be applied as a tuning signal to the VCO to adjust the operating frequency of the system. During periods when the tuning sequence is not being performed, a sample and hold circuit (not shown) in the VCO may maintain the VCO at the frequency set during the last preceding tuning sequence.

Advantageously, certain deconvolution techniques discussed on a theoretical level above may be used with the variable frequency logging systems just described above. Before presenting a detailed discussion of the practical implementation of these deconvolution techniques, consideration will be given to the vertical response of induction logging coil systems in an environment where propagation effects are negligible. Thereafter, the design of a deconvolution filter for such response functions will be presented.

The generalized expression for the vertical response function for an arbitrary coil system having T transmitter coils and R receiver coils approximately centered at a reference depth $Z_K$ is given by the expression:

$$G_v(z,z_k) = \sum_{i=1}^{T} \sum_{j=1}^{R} \frac{K_{T_iR_j}}{K_{eff}} g_{vij}(z,z_{kij}) \tag{16}$$

wherein $K_{TR}$ is a weighting constant for each of the transmitter-receiver pairs, $K_{eff}$ is a proportionality constant, $g_{vij}$ is the geometric factor for each two coil pair, $z_K$ is the center of the longitudinal axis of the coil system, $z_{kij}$ is the center of each coil pair (i j), and z is the point at which $G_V$ is computed.

Referring now to FIG. 3 the vertical response of a two coil system such as that employed in the apparatus of FIG. 1a will be briefly described. A two coil pair, including transmitter coil 62 and receiver coil 64, are shown schematically in FIG. 3. The separation between the two coils is given as dimension L. A reference point $Z_k$, which corresponds to the depth of investigation, is shown centered between the coil pair.

The plot 66 in FIG. 3 is the Doll vertical response of the coil pair, assuming propagation effects are negligible.

Generally the plot 66 is defined as follows:

$$G_v(z,z_k) = \frac{L}{8(z_k - z)^2} \text{ for } (z - z_k) > +L/2 \tag{17}$$

$$= \frac{1}{2L} \text{ for } |(z - z_k)| < L/2$$

$$= \frac{L}{8(z_k - z)} \text{ for } (z - z_k) < -L/2$$

As discussed above the vertical response function $G_v$ for a array of two or more coils including T transmitter coils and R receiver coils can be calculated where propagation effects are negligible using the relationship of equation (16). Such calculated vertical response functions for particular tools, may be used, according to the teachings of the present invention, to deconvolve the response of such coil systems, as will be discussed in detail below.

Measurements obtained from induction logging coil systems are of apparent conductivity $\sigma_A$ (usually given in mho/meter). The measured apparent conductivity at any particular depth, assuming cylindrical symmetry about the borehole, is the convolution of the vertical response function of the tool, $G_v$, and true conductivity $\sigma_T$ of the formation at, above, and below the measurement depth. In other words, the coil system does not normally provide true conductivity measurements for a thin slice of the formation at a depth of interest, but rather, produces an apparent conductivity measurement affected by essentially all of the surrounding formations, to an extent dictated by the geometry of the coil system.

Stated in mathematical terms the apparent conductivity measured at depth $Z_K$ is represented by the convolution integral based on the assumptions given for equation (3):

$$\sigma_A(z_k) = \int_{-\infty}^{+\infty} G_v(z_K - z)\sigma_T(z)dz \tag{18}$$

where Z is the vertical axis, generally colinear with the longitudinal axis of the well bore. This convolution is represented diagrammatically in FIG. 4 for a two coil system. The coil system is located in a formation having the true conductivity shown by plot 100. The system produces a plot 102, $\sigma_A(Z)$, which is a distorted replica of $\sigma_T(Z)$. This replication is governed by the convolution intregal which, in turn, depends on the vertical response function $G_v(Z)$. The plot 104 for $G_v$ is representative of a conventional two coil system. It should be understood, however, that the methods and apparatus for deconvolution discussed herein are applicable to more complex coil arrays exhibiting more complex $G_v(Z)$ plots.

A generalized mechanism for approximately determining $\sigma_T$, will now be discussed, the approximation being designated $\widetilde{\sigma}_T$. The solution relies on the appreciation that the response of the coil system 102 can be treated as a superposition of the response of the same coil system to a plurality of formation steps, the steps being chosen to approximate the true conductivity $\sigma_T$ of the formation. Such steps are indicated by the dotted lines 106, in FIG. 4. The steps are equivalent to an average true conductivity of an incremental horizontal layer in the formation.

The solution presented below also relies on the appreciation that a solution to the problem of deconvolution of the convolution of a superposition of an arbitrary number and arrangement of steps may be obtained from the solution for a single step function.

The true conductivity may be obtained by deconvolving the measured apparent conductivity:

$$\sigma_T(z_K) = \int_{-\infty}^{+\infty} G_v^{-1}(z - z_K)\sigma_A(z)dz \approx \tag{19}$$

$$\sum_{l=0}^{N} G_v^{-1}(z_l - z_k)\sigma_A(z_l)\Delta z$$

where $\Delta Z$ is the distance between each consecutive pairs of N points selected along the longitudinal axis of the well bore. Before equation (7) can be solved, the inverse vertical response function $G_v^{-1}$ must be found.

A function with N values is postulated which approximates the inverse vertical response function:

$$G_v^{-1} = (G_1^{-1}, \ldots G_N^{-1}) \tag{20}$$

In other words, N values of $G_v^{-1}$ are to be determined which deconvolve a single step function convolved by the theoretical vertical response function $G_v$ for the particular coil system in use. This process is indicated schematically in FIG. 5.

In FIG. 5, a hypothetical true conductivity $\sigma_T$ is represented by a single step function 130. The step function is convolved with the vertical response function of the tool, assuming negligible propagation effects, to obtain a value of apparent conductivity $$\sigma_A \approx \sum_{l=-\infty}^{+\infty} G_v(z_l - z_K)\sigma_T(z_l)\Delta z \tag{21}$$

An approximate value of the true conductivity $\sigma_T$ will be represented by $$\overline{\sigma}_T(k) = \sum_{l=1}^{N} G_v^{-1}(z_l - z_k)\sigma_A(z_l)\Delta z \tag{22}$$

$G_v^{-1}$ being selected to produce a replica 132 of the original single step function 130. The accuracy of the approximation will depend, in part, on the number of terms, N, in the summation.

The function $G_v^{-1}$ is found by employing the Ascent algorithm. See E. W. Cheney, *Introduction To Approximation Theory*, pp. 45-51 (McGraw-Hill 1966). The approximation proceeds by iteratively selecting N values for the function $G_v^{-1}$, by sampling the calculated values of the function $\bar{\sigma}_T$ at N points to minimize the maximum error between $\sigma_T$ and $\tilde{\sigma}_T$. Stated in mathematical terms, the maximum error $\delta$ is minimized:

$$\delta = \max \left| \left[ \sum_{l=1}^{N} G_v^{-1}(z_l - z_k)\sigma_A(z_l)\Delta z \right] - \sigma_T(z_k) \right| \quad (23)$$

or in more compact parallel notation $$\delta = \max | \sigma_A[l]*G_v^{-1}[l] - \sigma_T[l] | \quad (24)$$

In order to perform the approximation, a value M may be selected out of the maximum number of the $N_o$ points. These M points span the transition region of the replica $\tilde{\sigma}_T$. The parameter M is indicated in FIG. 5. The value M may be viewed as a parameter of depth resolution, having values equal to integral multiples of the distance between adjacent ones of the N points. Generally the smaller the value M, the greater the min max value $\delta$ will be and the greater the ripple in $\tilde{\sigma}_T$ will be.

In general this devolution filter design technique will produce filters with much sharper transition regions than conventional least squares filters.

The values for $G_v^{-1}$ are derived for this coil system by the Ascent algorithm as follows.

$N_o$ points are defined on the $\sigma(z)$ profile (see FIG. 5). After excluding M transition region points, the error in equation 24 is to be calculated on the remaining $Q = N_o - M$ points.

$$\delta = \max | \gamma_n(G_v^{-1}) | \; 1 \leq n \leq Q \quad (24a)$$

$$= \max \gamma_n(G_v^{-1}) \; 1 \leq n \leq 2Q \quad (24b)$$

where $$\gamma_n(G_v^{-1}) = \sigma_A(n)*G_v^{-1}(n) - \sigma_T(n) \text{ for } 1 \leq n \leq Q$$

and $$\gamma_n(G_v^{-1}) = -\gamma_{n-Q}(G_v^{-1}) \text{ for } Q+1 \leq n \leq 2Q$$

This analysis requires reference to two theorems found in the above cited Cheney reference at pages 35 and 36. These theorems lead to the conclusion that the optimal solution which minimizes $\delta$ is equation 24b, i.e., $$\delta_{optimum} = \min \max | \gamma_n(G_v^{-1}) | \quad (25)$$

is characterized by the following properties:

(1) There exists a unique subset of (N+1) equations out of 2Q equations (24)b at which the values of $$| \gamma_n(G_v^{-1}) | \text{ are equal to } \delta_{optimum} \quad (26)$$

(2) For the rest of the 2Q-N-1 equations, the values of $$| \gamma_n(G_v^{-1}) | \text{ are less than or equal to } \delta_{optimum} \quad (27)$$

(3) The value of $\delta$ optimum in property 1 is the required optimum solution to the minimization problem expressed in equation 24.

The Ascent algorithm is applied to the problem in the following steps:

(1) A subset of (N+1) equations is selected out of 2Q equations in 24b.

(2) The system of (N+1) equations in (N+1) unknowns (n values of $G_V^{-1}$ and one for deviation) is solved assuming that $|\gamma_n(G_v^{-1})|$ for the selected subset are equal.

(3) The deviations $\gamma_n(G_V^{-1})$ for the remaining (2Q-N-1) equations (hereinafter "remaining subset") are computed (4) If the largest value of $|\gamma_n(G_v^{-1})|$ computed in step 3 is less than or equal to the value of $\gamma n(G^{-1})$ computed in step 2, then the computed $G^{-1}_V$ is the correct optimum solution and the computation is complete.

(5) If the largest value of $|\gamma_n(G_v^{-1})|$ computed in step 3 is greater than the value of $\gamma_n(G^{-1})$ computed in step 2, then a new selected subset is created such that the equation corresponding to the largest value of $|\gamma_n(G_v^{-1})|$ in the remaining subset replaces one of the equations of the selected subset. This is done in such a manner that the new computed value of $|\gamma_n(G_v^{-1})|$ of the new selected subset will be larger than the previous value computed in step 2. Step two is then performed again.

The steps 2, 3, 4 and 5 are iterated until the condition of step 4 is satisfied. The optimum solution will be reached because there are a finite number of subsets of (N+1) equations which can be selected out of 20 equations. If, at a given iteration, the value of the deviation $|\gamma_n(G_v^{-1})|$ in step 2 is not the unique optimal solution, then at the next iteration it is guaranteed to be larger. This implies that starting from an initial subset of equations in step 1, no subsequent selected subset is picked more than once. This ensures that the algorithm will proceed monotonically to the optimal solution.

An example is presented of the results of application of this technique to find $G_v^{-1}$ for a six coil system where N=31.

The geometric parameters of the six coil systems are as follows, the vertically central reference point $Z_K$ of the system being assigned the vertical location of 0 inches:

| Coil | Number of turns | Vertical Distance from $Z_K$ |
|------|-----------------|------------------------------|
| $T_1$ | −8 | −50 inches |
| $R_1$ | +360 | −20 inches |
| $R_2$ | −90 | −10 inches |
| $T_2$ | −130 | +10 inches |
| $T_3$ | +120 | +20 inches |
| $R_3$ | −24 | +50 inches | wherein T indicates a transmitter coil and R indicates a receiver coil. A negative number of turns indicates a counterclockwise winding and a positive number of turns indicates a clockwise winding. The plane of each of the coils is perpendicular to the Z axis and the radii of the coils are equal.

The 31 calculated values for $G_v^{-1}$ are given below in tabular form:

TABLE III

| N | Value of $G_v^{-1}$ |
|---|---|
| 1 | 0.014499 |
| 2 | −0.024474 |
| 3 | 0.014974 |
| 4 | −0.002397 |
| 5 | −0.038116 |
| 6 | 0.051041 |
| 7 | −0.021163 |
| 8 | −0.024463 |
| 9 | 0.013280 |
| 10 | 0.0019443 |
| 11 | −0.0094786 |
| 12 | −0.091077 |
| 13 | 0.20446 |
| 14 | −0.081372 |
| 15 | −0.32721 |
| 16 ($Z_K$) | 0.92008 |
| 17 | −0.32721 |
| 18 | −0.081372 |
| 19 | 0.20446 |
| 20 | −0.091077 |
| 21 | −0.0094786 |
| 22 | 0.0019443 |
| 23 | 0.013280 |
| 24 | −0.024463 |
| 25 | −0.021163 |
| 26 | 0.051041 |
| 27 | −0.038116 |
| 28 | −0.0023970 |
| 29 | 0.014974 |
| 30 | −0.024474 |
| 31 | 0.014499 |

The foregoing values were obtained for M=4 and a distance of 10 inches between adjacent ones of the N points. The maximum error in $G_v^{-1}$ was calculated to be −0.002.

The values of $G_V^{-1}$ listed above can be used to calculate the value of $\bar{\sigma}_T$ at the depth corresponding to $Z_K$ by performing the summation indicated in equation (22) for readings of $\sigma_A$ obtained at each of 31 depths corresponding to the N points.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An induction well logging apparatus for measuring the true conductivity of earth formations in the vicinity of a well borehole comprising:
   (a) transmitter and receiver coil system for movement through a well borehole and operated so that variation of propagation effects in the formation are negligible, said coil system providing an output signal related in value to the apparent conductivity of the formation; and
   means for operating on said output signal with an inverse vertical response function of said coil system to obtain a signal related in value to an approximation of the true conductivity of an incremental portion of the formation adjacent the well bore at the depth of investigation; and
   means for recording said signal related to an approximation of the true conductivity as a function of borehole depth of said coil system.

2. A method of deconvolving apparent conductivity measurements obtained from an induction logging system including an induction coil system for passage in a well borehole to obtain output signals related to the true conductivity of the earth formations penetrated by a well borehole, comprising the steps of:
   deriving a vetical response function for said coil system in an environment with negligible propagation effects, said vertical response function being primarily a function of the spacing and turns ratio structure of said coil system;
   convolving a step function with said vertical response function;
   obtaining an inverse vertical response function by means of the Ascent Algorithm which, when applied to said convolved step function approximates the step function; and
   converting signals obtained from said induction coil system as said coil system is moved through a well borehole, and functionally related to the apparent conductivity of the formation penetrated by the borehole, to an output signal functionally related to the actual conductivity of an incremental layer of the formation by employing said inverse vertical response function to deconvolve the coil system signals; and
   recording said actual conductivity related output signals as a function of borehole depth.

3. The method of claim 2 wherein the conversion to a signal functionally related to the actual conductivity of an incremental layer of the formation, treats said signal as the convolution of plural, superposed steps.

4. An apparatus for measuring an approximation of the actual conductivity of a portion of an earth formation adjacent a well bore, comprising:
   a coil system for passage through a well borehole and including at least one transmitter coil and at least one receiver coil, longitudinally spaced therefrom, said coil system being operated in such a manner as to have an approximately fixed vertical response function, and said coil system providing a plurality of measurement signals related in value to the apparent conductivity of the formation at a plurality of depths in the vicinity of a depth of interest;
   means for storing signal values representative of an inverse vertical response function of said coil system for a plurality of locations along the longitudinal axis of said coil system, and inverse vertical response function signals being calculated from said approximately fixed vertical response function of the coil system in a uniform medium;
   means for multiplying each of said plurality of measurement signals of apparent conductivity with a corresponding value of the inverse vertical response function and for summing the products so obtained to yield as an output signal an approximation of the actual conductivity of the formation at the depth of interest; and,
   means for recording said output signals as a function of the borehole depth of said coil system.

5. The apparatus of claim 4 wherein the coil system is moved along the longitudinal axis of the well bore to obtain measurements of the actual conductivity at N different depths including the depth of interest.

6. The apparatus of claim 5 wherein N values of the inverse vertical response function are stored corresponding to N different depths.

7. The apparatus of claim 6 wherein N is selected to provide the desired degree of depth resolution.

8. The apparatus of claim 4 wherein the inverse vertical response function $G_v^{-1}$ is calculated by means of an Ascent algorithm to minimize the value of the following expression:

$$\max \left| \left[ \sum_{l=1}^{N} G_v^{-1}(z_l - z_K)\sigma_A(z_l)\Delta z \right] - \sigma_T(z_k) \right|$$

where z is a depth variable, $\sigma_T$ is a hypothetical true conductivity step function, and $\sigma_A$ is a convolution of $\sigma_T$ with the vertical response function $G_v$ of the tool in an environment with negligible propagation effects.

9. A method for measuring the conductivity of an earth formation adjacent a well bore at a depth of interest comprising the steps of:
 (a) locating a coil system including at least one receiver coil and at least one transmitter coil in the well bore;
 (b) impressing a signal on said at least one transmitter coil, the frequency of said signal being selected to maintain substantially constant propagation effects encountered in the earth formation;
 (c) measuring a receiver voltage of said coil system at different depths in said well bore to provide output signals related in value to the apparent conductivity of the formation at said locations;
 (d) varying the frequency of the signal impressed on said at least one transmitter coil in response to the rate of change of apparent conductivity of the formation with variation of the frequency impressed on at least one transmitter coil thereby maintaining an approximately constant vertical geometrical factor for said coil system;
 (e) operating on a signal derived from said measured receiver voltage with an inverse vertical response function for said coil system centered at the depth of interest to obtain a product; and
 (f) summing the products of step (e) over a selected range of depths to produce a signal related in value to the true conductivity of the earth formations at the depth of interest and recording said true conductivity related signal as a function of borehole depth.

10. An induction well logging apparatus comprising:
 a transmitter and receiver coil system operated at a selected frequency, said coil system providing a signal related in value to the apparent conductivity of the formation;
 means for operating on said signal with an inverse vertical response function of the coil system to obtain a signal related in value to an approximation of the conductivity of an incremental portion of the formation adjacent the well bore at the depth of investigation; and
 means for selecting the frequency of operation to minimize variation in propagation effects by maintaining a rate of change of apparent conductivity with frequency, $d\sigma_A/df$, below a predetermined threshold value, e.

11. The apparatus of claim 10 wherein the frequency selection means includes;
 means for varying the frequency of operation during a tuning sequence;
 means for producing a signal related in value to the variations in a receiver coil voltage corresponding to the variation in the operating frequency during the tuning sequence;
 means for producing a differential signal related in value to $d\sigma_A/df$;
 means for comparing the differential signal with the threshold value e; and
 means for producing a tuning signal for selecting the frequency of operation of the system after the tuning sequence is complete.

* * * * *